(12) United States Patent
Kato et al.

(10) Patent No.: US 6,720,517 B2
(45) Date of Patent: Apr. 13, 2004

(54) RESISTANCE WELDING HEAD AND RESISTANCE WELDING APPARATUS AND METHOD USING THE HEAD

(75) Inventors: Shigeru Kato, Yokkaichi (JP); Tatsuya Hattori, Yokkaichi (JP)

(73) Assignee: Sumitomo Wiring Systems, Ltd., Yokkaichi (JP)

( * ) Notice: Subject to any disclaimer, the term of this patent is extended or adjusted under 35 U.S.C. 154(b) by 0 days.

(21) Appl. No.: 10/193,097

(22) Filed: Jul. 12, 2002

(65) Prior Publication Data

US 2003/0015502 A1 Jan. 23, 2003

(30) Foreign Application Priority Data

Jul. 23, 2001 (JP) ........................ 2001-222034

(51) Int. Cl.[7] ............................... B23K 11/10
(52) U.S. Cl. ................................. 219/86.61
(58) Field of Search .............. 219/86.61, 86.7, 219/86.25, 87

(56) References Cited

U.S. PATENT DOCUMENTS

| | | | | | |
|---|---|---|---|---|---|
| 4,352,971 | A | * | 10/1982 | Slade | 219/86.61 |
| 5,484,975 | A | * | 1/1996 | Itatsu | 219/86.7 |
| 5,818,007 | A | * | 10/1998 | Itatsu | 219/86.25 |
| 5,988,486 | A | * | 11/1999 | Kobayashi et al. | 228/212 |
| 6,075,219 | A | | 6/2000 | Furukawa et al. | 219/119 |
| 6,337,456 | B1 | * | 1/2002 | Taniguchi et al. | 219/86.25 |

* cited by examiner

*Primary Examiner*—Kevin P. Kerns
(74) *Attorney, Agent, or Firm*—Greenblum & Bernstein, P.L.C.

(57) ABSTRACT

A resistance welding head carries out resistance welding while clamping spots are being welded by a pair of electrodes. The head is floated in a direction Y perpendicular to a direction X of juxtaposing the spots being welded. The pair of electrodes clamp the spots being welded while centering by acting a reaction force exerted when the electrodes clamp the spots to the resistance welding head. Then, resistance welding starts.

20 Claims, 14 Drawing Sheets

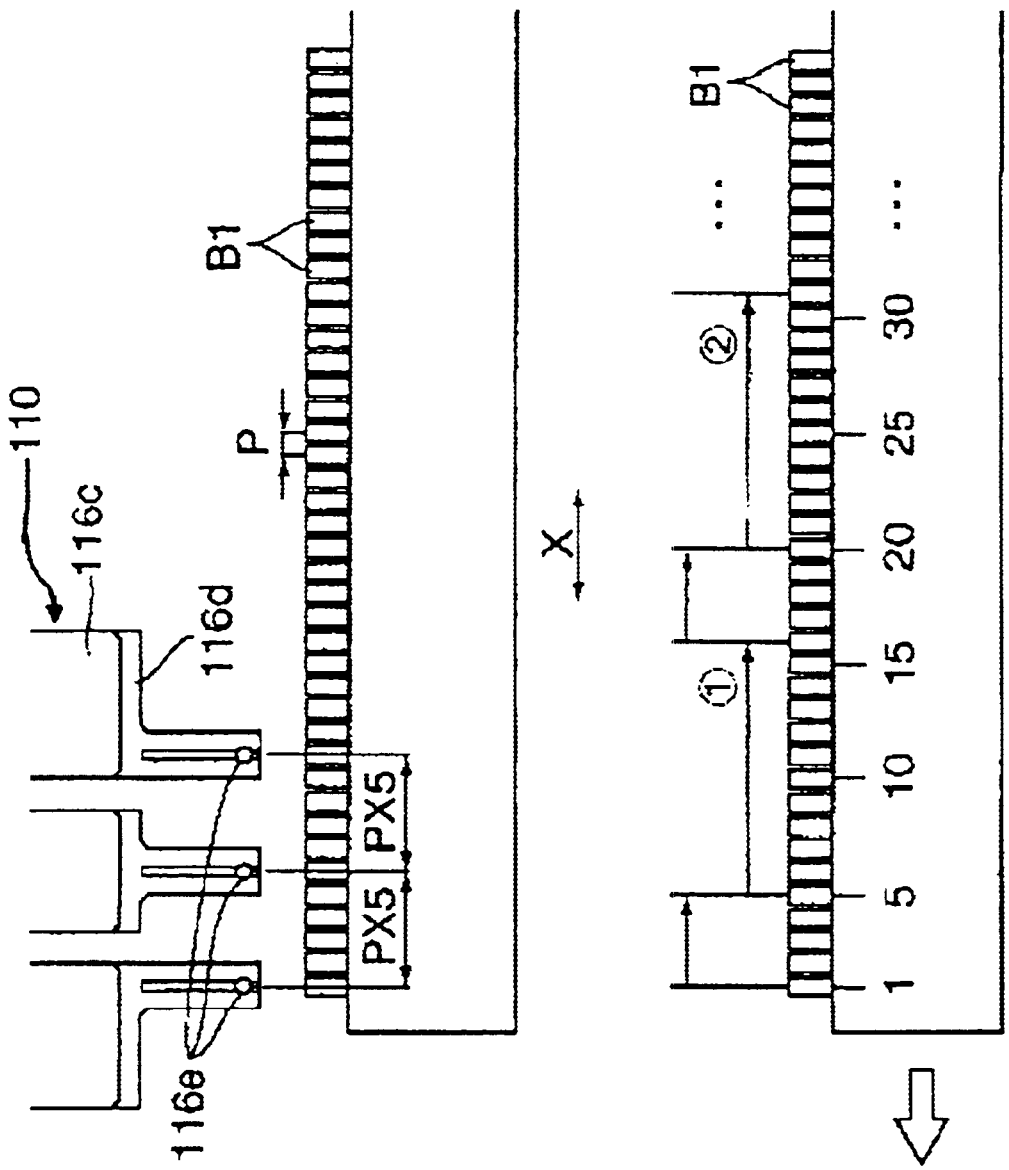

RESISTANCE WELDING HEAD AND RESISTANCE WELDING APPARATUS AND METHOD USING THE HEAD

BACKGROUND OF THE INVENTION

1. Field of the Invention

This invention relates to a resistance welding head, and a resistance welding apparatus and a resistance welding method, which use the resistance welding head.

2. Description of Related Art

In general, a wire harness for an automobile has adopted an electric connection box. The electric connection box contains wiring materials such as laminated bus bars or the like. The laminated bus bars constitute branch circuits in electric wiring. A plurality of bus bar blanks, which constitute electric circuits corresponding to a type of an automobile are formed by stamping a hoop material. Cutting and upset the bus bar blanks form tab terminals. The laminated bus bar is formed by interposing an insulation plate between the bus bars. The laminated bus bars are accommodated in a case.

A contact of the electric connection box is formed by welding the spots being welded between bus bars or by welding the spots being welded between the bus bar and electric wires by means of a spot welding apparatus.

Currently, circuits to be contained in the electric connection box are rapidly increasing in connection with the increase of electrical equipments to be mounted on an automobile. Accordingly, it has been required to produce branch circuits having a high density from a few parts.

Consequently, it has been known to divide the electric connection box into several sections, to design the sections in modules and to form circuits by welding conductor terminals provided between the modules.

As described above, the divided modules are joined to each other upon production of the electric connection box designed in modules. Consequently, it is necessary to join and weld free ends of the bus bars provided in the respective modules. Many spots being welded of the bus bars are juxtaposed very closely to one another. Since the bus bars are cut and set by a press operation, the bus bars are not always aligned precisely in the juxtaposing direction. On the other hand, a spot welding apparatus carries current in a pair of electrodes while clamping the spots being welded between the electrodes. If only one of the electrodes comes into contact with the spot being welded, the welded portion will deteriorate. In the case where many spots being welded are arranged in a poor alignment condition, it is necessary to position a pair of electrodes for every spot being welded, thereby lowering the working efficiency.

SUMMARY OF THE INVENTION

In view of the above problems, an object of the present invention is to provide a resistance welding head that can weld a number of spots, which may be poorly aligned, and a resistance welding apparatus and a resistance welding method that utilize the resistance welding head.

In order to overcome the above problems, the present invention is directed to a resistance welding head including a pair of holding units including a pair of electrodes that clamp spots being welded along a joining direction, the spots being welded being stationary in positions joined to each other, the electrodes being movable relative to each other between a welding position where the electrodes clamp the spots being welded and a releasing position where the electrodes release the spots being welded; and a driving mechanism for driving the pair of electrodes through the holding units between the welding position and the releasing position. The resistance welding head is characterized in that: a floating guide supports the pair of holding units floated movably along the joining direction so that the center of the distance between the opposing electrodes coincides with the joining center of the distance between joined surfaces of the spots being welded in a process in which the electrodes clamp the spots being welded; the driving mechanism is provided on one of the holding units; and the driving mechanism drives the other holding unit through the one holding unit.

According to the present invention, since the driving mechanism is provided on the one holding unit and drives the other holding unit through the one holding unit, when the other holding unit is displaced by the actuation of the driving mechanism, the one holding unit is displaced by the reaction force against the other holding unit and thus the pair of the electrodes are displaced from the releasing position to the welding position. During this displacement process, the respective electrodes come into contact with the spots being welded and then clamp them. At the time, even if the joined surfaces of the spots being welded are offset from the center of the distance between the opposing electrodes, both electrodes are floated movably along the clamping direction of the spots being welded through the floating guide by means of the reaction force against the electrode that is first brought into contact with the spots being welded. Consequently, the opposing center of the distance between the opposing electrodes coincides with the joined surfaces of the spots being welded. Since the present invention can perform such a self-centering function, both electrodes can clamp the spots being welded, which are in an equal contact condition and a precise welding can be carried out efficiently after the electrodes reach the welding position.

Another aspect of the present invention is directed to a resistance welding apparatus including a current-carrying mechanism for carrying welding current to the respective electrodes; an electrode position detecting mechanism that detects whether or not the respective electrodes clamp spots being welded; and a control device that controls the current-carrying mechanism so that the welding current can be carried to the respective electrodes when the electrode position detecting mechanism detects that the respective electrodes clamp the spots being welded.

Still another aspect of the present invention is directed to a resistance welding apparatus for welding a number of spots being welded, which are juxtaposed at equal intervals, by using a plurality of resistance welding heads described above, that includes a work holder for holding the spots being welded; a welding head assembly including a plurality of resistance welding heads disposed along the juxtaposing direction of the spots being welded; a mechanism for disposing the spots being welded between the electrodes of the resistance welding heads by driving the welding head assembly and the work holder relative to each other; and an intermittent driving mechanism for intermittently driving the resistance welding heads at a pitch between the spots being welded supplied between the electrodes by driving the welding head assembly and the work holder relative to each other. The electrodes of the resistance welding heads are spaced at a distance of an integer times a pitch of the spots being welded, and a control device that controls the intermittent driving mechanism is provided so that the electrodes of the resistance welding heads pass over the welded spots.

In the present invention, when a plurality of resistance welding heads weld a number of spots being welded, which are juxtaposed at equal intervals of distance, the respective electrodes of the resistance welding heads are disposed at intervals of the integer times the pitch of the spots being welded. When the respective resistance welding heads are driven by the intermittent driving mechanism, the respective resistance welding heads can weld the corresponding spots being welded.

Still another aspect of the present invention is directed to a resistance welding method for welding a number of spots being welded, which are juxtaposed at equal intervals of distance, including: disposing a resistance welding head having a pair of electrodes for clamping spots being welded in a manner of floating movably in a direction perpendicular to the juxtaposing direction of the spots being welded; applying to the resistance welding heads a reaction force exerted when the electrodes clamp the spots being welded; clamping the spots being welded while centering the electrodes; and starting a resistance welding step.

Still another aspect of the present invention is directed to a resistance welding method for welding a number of spots being welded, which are juxtaposed at an equal interval of distance by using a plurality of resistance welding heads described above, including: disposing the resistance welding heads at equal intervals of plural times a pitch of the spots being welded in the juxtaposing direction of the spots; resistance welding the spots being welded while intermittently driving the resistance welding heads together at the pitch of the spots; and driving the resistance welding heads so that the respective electrodes pass over the welded spots.

According to an aspect of the present invention, a resistance welding head is provided including a pair of holding units including a pair of electrodes, the holding units being movable relative to each other in a joining direction between a welding position in which the electrodes clamp together and a releasing position in which the electrodes are spaced from each other, a floating guide that supports the pair of holding units for floating movement in the joining direction between the welding position and the releasing position, a driving mechanism that drives the pair of holding units in the joining direction between the welding position and the releasing position, wherein the driving mechanism is provided on a first holding unit of the pair of the holding units and is configured to drive a second holding unit of the pair of holding units via the first holding unit. Further, the resistance welding head may include a support body including a pair of end plates opposed to each other in the joining direction, and the floating guide may further include a pair of spaced guide bars, each the guide bar extending in the joining direction between the pair of end plates, the pair of guide bars supporting the pair of holding units for floating movement in the joining direction between the welding position and the releasing position. The first and second holding units may further include a block, an electrode holder provided on a first end of the block and holding a respective electrode thereon, an electrode attachment tab provided on the block and configured to provide current flow to a respective electrode, and a slide section provided on a second end of the block and guided by the guide bars, the slide section including first and second slide bearings, each of the first and second slide bearings corresponding to one of the pair of guide bars and configured to slide thereover in the joining direction, so that the pair of holding units reciprocate smoothly over the pair of guide bars in the joining direction from the welding position to the releasing position and from the releasing position to the welding position.

According to a further aspect of the present invention, the driving mechanism may further include a bracket provided on the first holding unit, an air cylinder provided on the bracket, the air cylinder including a rod configured to reciprocate in the joining direction, a drive shaft extending through slide bearings in the pair of slide sections; the drive shaft including a first end coupled to the rod, wherein upon retraction of the rod, the drive shaft drives the second holding unit through the slide bearings in the pair of slide sections in the joining direction toward the first holding unit and reaction force produced thereby drives the first holding unit through the slide bearings in the joining direction toward the second holding unit so that the pair of holding units are driven symmetrically toward each other to the welding position. The driving mechanism may further include a driving flange provided on a distal end of the drive shaft, a pressure receiving flange slidably provided on the drive shaft, and a compression spring provided on the drive shaft between the driving flange and the pressure receiving flange, wherein upon retraction of the rod, the pressure receiving flange is driven by the driving flange through the compression spring and the second holding unit is driven in the joining direction toward the first holding unit and the reaction force produced thereby drives the first holding unit in the joining direction toward the second holding unit so that the pair of holding units are driven symmetrically toward each other to the welding position. The driving mechanism may further include a pushing flange provided on the drive shaft between the first holding unit and the second holding unit, and a pressure receiving projection provided on the second holding unit, wherein upon extension of the rod, the drive shaft extends and second holding unit is driven by the pushing flange in the joining direction away from the first holding unit and reaction force produced thereby drives the first holding unit through the slide bearings in the joining direction away from the second holding unit so that the pair of holding units are driven symmetrically toward each other to the releasing position. The driving mechanism may further include a pair of stopper pins provided on the pair of end plates, each the stopper pin extending from a respective end plate toward the holding units and limiting movement of the holding units in the joining direction to the releasing position, and a pair of compression coil springs, each the compression coil springs provided on a respective stopper pin between a respective end plate and holding unit, the pair of compression coil springs elastically holding the holding units in the welding position.

In another aspect of the present invention, the floating guide supports the pair of holding units for floating movement in the joining direction toward the welding position so that when the first and second holding units clamp together the first and second electrodes contact a pair of bus bars tabs equally for precise welding. The floating guide may support the pair of holding units for floating movement in the joining direction toward the welding position so that when the first and second holding units clamp together the first and second electrodes contact a dressing plate equally for precise polishing. Further, the resistance welding head may further include an intermittent driving mechanism that intermittently drives a plurality of resistance welding heads, the plurality of resistance welding heads being spaced from each other a distance equal to an integer times a pitch between articles to be welded, and the intermittent driving mechanism intermittently driving the plurality of resistance welding heads a distance equal to the pitch between articles to be welded; and a control means that controls the intermittent driving mechanism so that electrodes of the plurality of resistance welding heads may be driven a distance equal to an integer times the pitch of the articles to be welded and pass over the welded spots.

A further aspect of the present invention includes a method of welding using a resistance welding head, the method including providing a pair of holding units including a pair of electrodes, the holding units being movable relative to each other in a joining direction between a welding position in which the electrodes clamp together and a releasing position in which the electrodes are spaced from each other, providing a floating guide that supports the pair of holding units for floating movement in the joining direction between the welding position and the releasing position, providing a driving mechanism that drives the pair of holding units in the joining direction between the welding position and the releasing position, wherein the driving mechanism is provided on a first holding unit of the pair of the holding units and is configured to drive a second holding unit of the pair of holding units via the first holding unit, and driving the pair of holding units in the joining direction between the welding position and the releasing position while floatably guiding the pair of holding units. The method may further include supporting the pair of holding units on the pair of guide bars and floatably moving the pair of holding units in the joining direction between the welding position and the releasing position. The method may further include smoothly reciprocating the pair of holding units in the joining direction from the welding position to the releasing position and from the releasing position to the welding position. Further, the method may include driving the second holding unit in the joining direction toward the first holding unit, and thereby symmetrically driving the pair of holding units toward each other to the welding position and the driving flange driving the receiving flange through the compression spring; driving the second holding unit toward the first holding unit, thereby symmetrically driving the pair of holding units toward each other to the welding position, and the drive shaft extending and driving the second holding unit away from the first holding unit, thereby symmetrically driving the pair of holding units toward each other to the releasing position.

In a further aspect of the present invention, the method may include elastically holding the pair of holding units in the welding position when the pair of holding units are moved toward each other; self-centering the pair of electrodes about a pair of bus bar tabs, and clamping the pair of electrodes together and welding the pair of bus bar tabs. The method may further include self-centering the pair of electrodes about a dressing plate; clamping the pair of electrodes together and polishing the pair of electrodes. The method may include intermittently driving a plurality of resistance welding heads, the plurality of resistance welding heads being spaced from each other a distance equal to an integer times a pitch between articles to be welded, and the intermittent driving mechanism intermittently driving the plurality of resistance welding heads a distance equal to the pitch between articles to be welded, and controlling the intermittent driving mechanism so that electrodes of the plurality of resistance welding heads are driven a distance equal to an integer times the pitch of the articles to be welded and pass over the welded spots.

BRIEF DESCRIPTION OF THE DRAWINGS

The foregoing and other features of the present invention will become apparent to one skilled in the art to which the present invention relates upon consideration of the invention with reference to the accompanying drawings, wherein:

FIGS. 8(A) and 8(B) are explanatory views illustrating a controlling operation of a control device in the apparatus shown in FIG. 2 in accordance with the present invention;

DETAILED DESCRIPTION OF THE PREFERRED EMBODIMENTS

The particulars shown herein are by way of example and for purposes of illustrative discussion of the embodiments of the present invention only and are presented in the cause of providing what is believed to be the most useful and readily understood description of the principles and conceptual aspects of the present invention. In this regard, no attempt is made to show structural details of the present invention in more detail than is necessary for the fundamental understanding of the present invention, the description taken with the drawings making apparent to those skilled in the art how the several forms of the present invention may be embodied in practice.

Figure 1B:
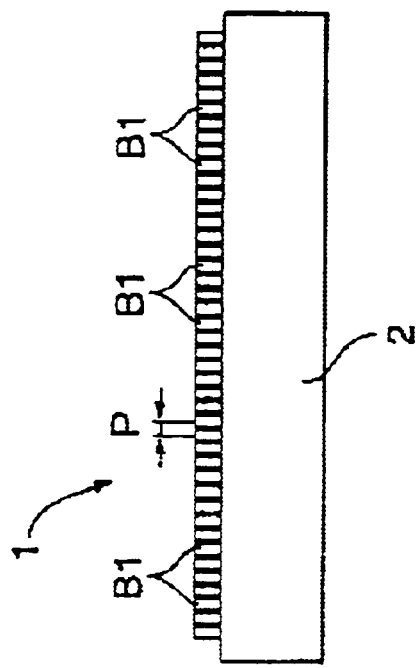
FIGS. 1(A) and (B) show schematic construction views of a work such as an electric connection box to, which the present invention is applied, FIG. 1(A) being a side elevation view and FIG. 1(B) being a cross sectional view taken along line 1B—1B in FIG. 1(A)
Figure 1A:
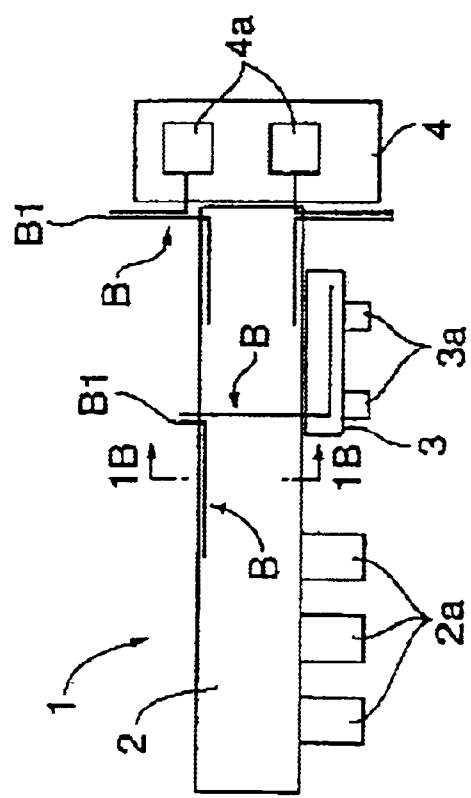

FIGS. 1(A) and 1(B) show schematic construction views of a component such as an electric connection box to which the present invention is applied. FIG. 1(A) is a side elevation view and FIG. 1(B) is a cross sectional view taken along line 1B—1B in FIG. 1(A).

In FIGS. 1(A) and 1(B), an electric connection box 1 to which the present invention is applied includes a connector module 2 which defines a main housing, a relay module 3 and a fuse module 4 connected to the connector module 2, respectively. The respective modules 2 to 4 correspond to a connector circuit section having connectors 2a, a relay circuit section having relays 3a, and a fuse circuit section having fuses 4a formed in the electric connection box on a wire harness (not shown). In order to give electric connection to the respective modules 2 to 4, a plurality of bus bars B is disposed in the connector module 2 in accordance with circuit construction. As shown in FIG. 1(B), a tab B1 of the bus bar B forms a spot being welded in the present embodiment. A number of pairs (for example, 50 to 100 pairs) of tabs B1 are juxtaposed along a width direction of the connector module 2 at a given pitch P.

Figure 2:
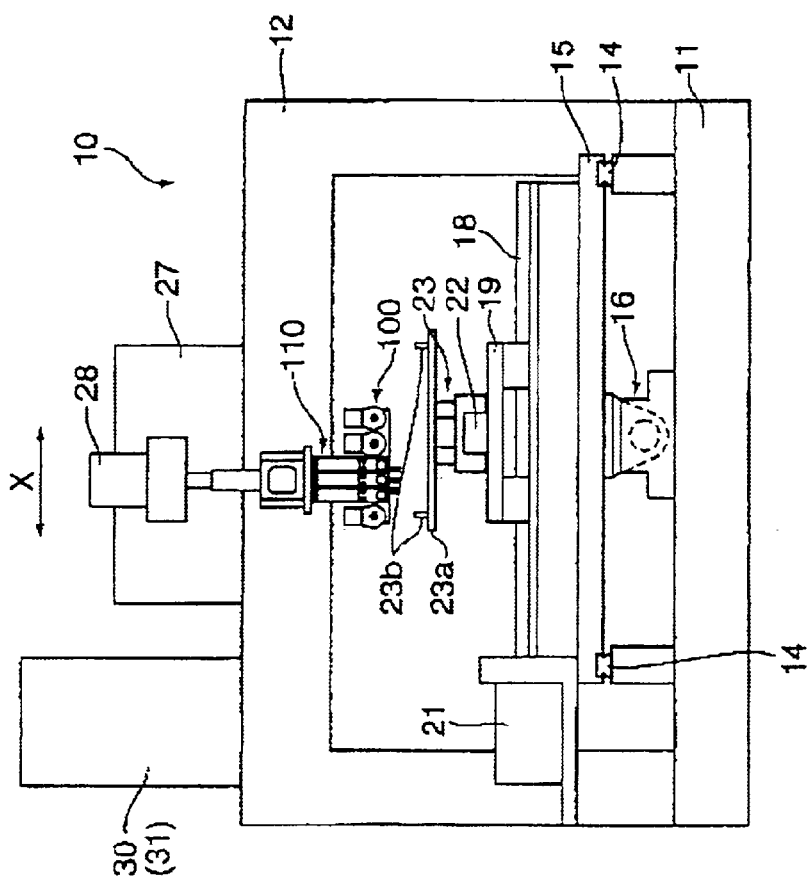
FIG. 2 is a front elevation view of a resistance welding apparatus of the present invention, illustrating a general construction of the apparatus.
Figure 3:
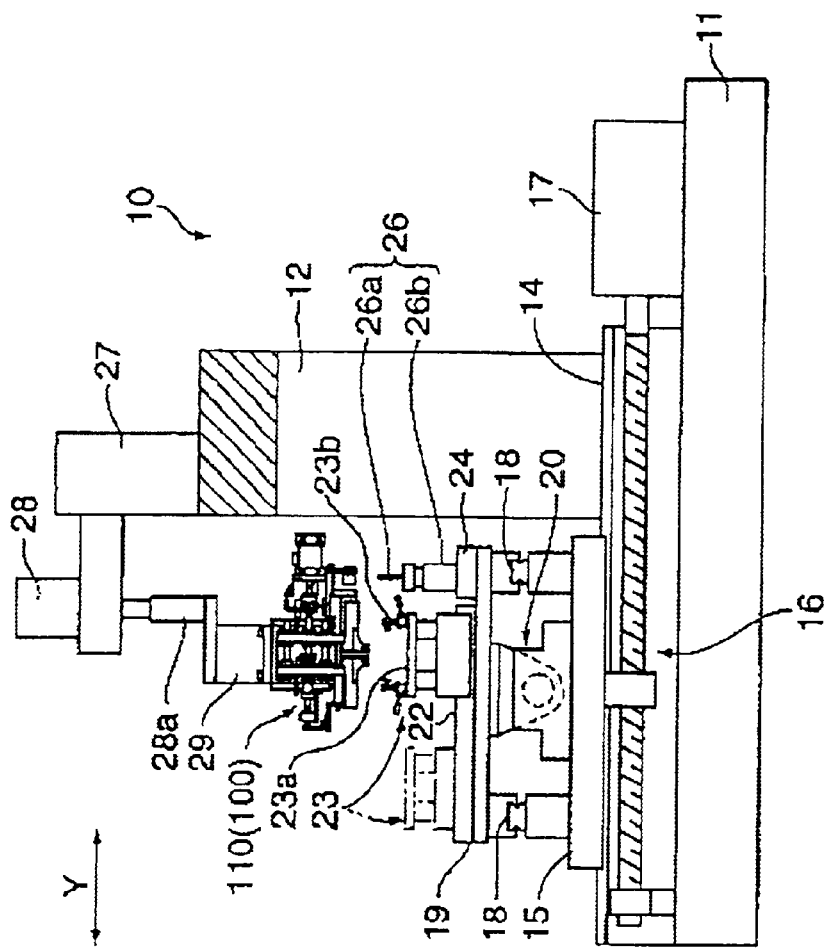
FIG. 3 is a side elevation view of a resistance welding apparatus of the present invention, illustrating a general construction of the apparatus.

FIG. 2 is a front elevation view of a resistance welding apparatus of the present invention, illustrating a general construction of the apparatus. FIG. 3 is a side elevation view of the resistance welding apparatus shown in FIG. 2. A width direction of a resistance welding apparatus 10 is defined as a direction X and a depth direction of the apparatus 10 is defined as a direction Y.

Referring now to FIGS. 2 and 3, the resistance welding apparatus 10 of the present invention includes a base 11 and a gate-like frame 12 that form the structure of the apparatus. As described in more detail below, a welding head assembly 100 secured to the frame 12 in the apparatus 10 welds bus bars B in an electric connection box mounted on the base 11.

A pair of longitudinal movement (LM) guides 14 are provided on the base 11 in the direction Y of the resistance welding apparatus 10. A slide table 15 is mounted on the longitudinal movement guides 14 to effect reciprocating motion in the direction Y. The slide table 15 is coupled to the base 11 by a ball screw or worm gear mechanism 16 to reciprocate in the direction Y. The ball screw or worm gear mechanism 16 is driven by a motor 17 fixed on a rear part of the base 11 to move the slide table 15 in the direction Y.

A pair of longitudinal movement guides 18 extending in the direction X are provided on the slide table 15. The longitudinal movement guides 18 guide a feed table 19 so that the table 19 can reciprocate in the direction X. The feed table 19 is coupled to the slide table 15 by a ball screw or worm gear mechanism 20 that drives the feed table 19 in the direction X. When a motor 21 mounted on an end of the slide table 15 drives the ball screw mechanism 20, the feed table 19 is moved in the direction X. The motor 21 forms an intermittent driving mechanism which intermittently drives a work holder 23 mounted on the feed table 19 when the motor 21 intermittently drives the feed table 19 at the pitch P of the tabs B1 in the direction X.

A rodless cylinder 22 extending in the direction Y is provided on the feed table 19. A work holder 23 which holds the bus bars B is mounted on the rodless cylinder 22 so that the work holder 23 can reciprocate in the direction Y.

The work holder 23 includes a planar support table 23a and conventional toggle clamps 23b disposed on the four corners of the table 23. The toggle clamps 23b can clamp the bus bars B being welded. After the toggle clamps 23b precisely align the tabs B1 of the bus bars B (see FIG. 1(B)) with the direction X, the toggle clamps 23b fix the bus bars B to the support table 23a adjacent to the welding head assembly 100. The rodless cylinder 22 can reciprocate the work holder 23 in the direction Y between a work detachable position shown by an imaginary line in FIG. 3 and a work supply position shown by a solid line.

As shown in FIG. 3, a rodless cylinder 24 extending in the direction X at a rear end side of the rodless cylinder 22 is provided on the feed table 19. A dressing unit 26 for dressing the electrodes of the welding head assembly 100 is provided on an upper portion of the rodless cylinder 24. The dressing unit 26 includes a dressing plate 26a adapted to scour the electrodes and an air cylinder 26b adapted to elevate the dressing plate 26a.

The frame 12 which forms the structure has a stay 27 on the upper portion. An air cylinder 28 is fixed on a front surface of the stay 27 so that the air cylinder 28 can move the rod 28a up and down. The welding head assembly 100 is secured through a holder 29 to a lower end of the rod 28a so that the assembly 100 can move up and down. As shown in FIG. 2, a transformer 30 for supplying welding current to the welding head assembly 100 is disposed on an upper portion of the frame 12. In the illustrated embodiment, the transformer 30 and a controller 31 (see FIG. 7) for controlling the transformer 30 are provided on every resistance welding head 110 described below.

Figure 4:
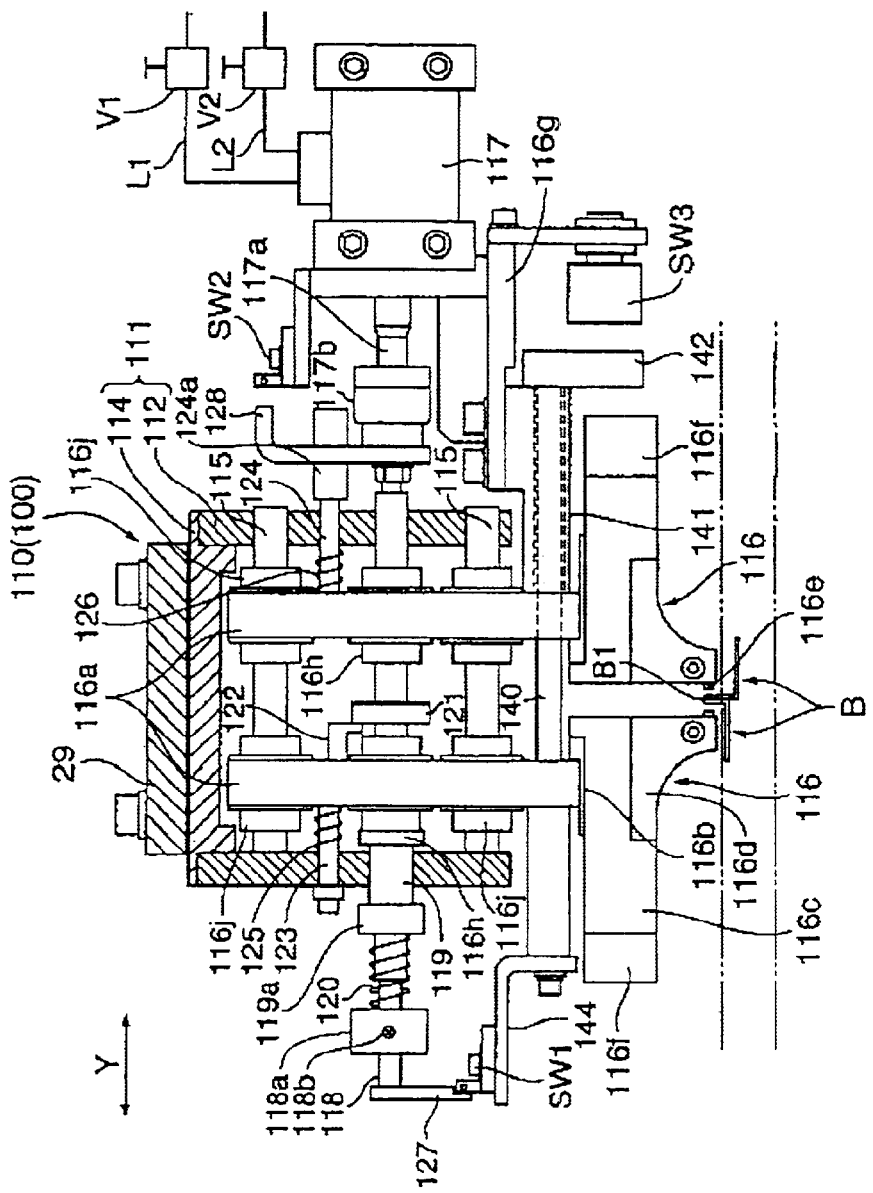
FIG. 4 is a partially broken away side elevation view of a welding head assembly of the apparatus shown in FIG. 2 in accordance with the present invention.
Figure 5:
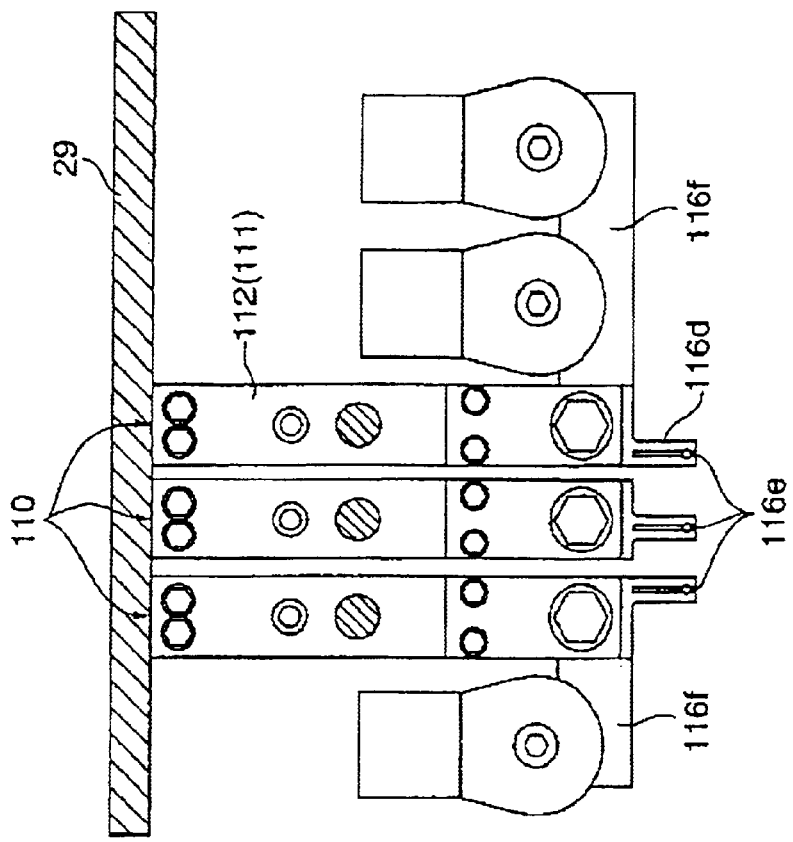
FIG. 5 is a schematic front elevation view of the welding head assembly in the apparatus shown in FIG. 2 in accordance with the present invention.
Figure 6:
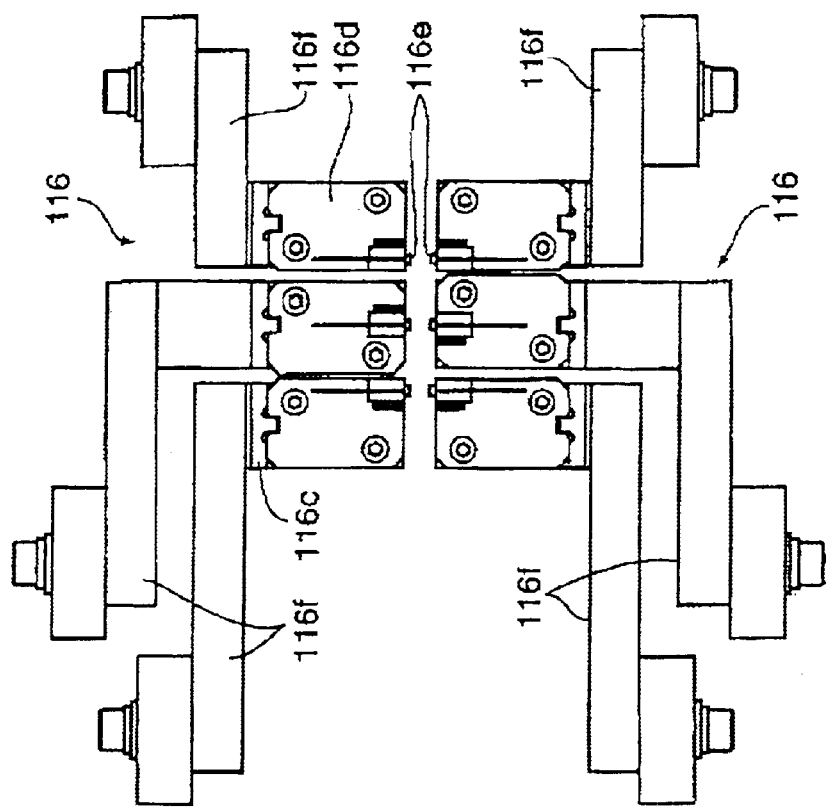
FIG. 6 is a schematic bottom view of the welding head assembly in the apparatus shown in FIG. 2 in accordance with the present invention.

Next, referring to FIGS. 4 through 6, the welding head assembly 100 adopted in the resistance welding apparatus 10 will be explained in detail. FIG. 4 is a partially broken away side elevation view of the welding head assembly in the apparatus shown in FIG. 2 in accordance with the present invention. FIG. 5 is a schematic front elevation view of the welding head assembly in the apparatus shown in FIG. 2 in accordance with the present invention. FIG. 6 is a schematic bottom view of the welding head assembly in the apparatus shown in FIG. 2 in accordance with the present invention.

Referring to these drawings, the welding head assembly 100 illustrated in the drawings includes a series of resistance welding heads 110 connected together in the direction X. The welding head assembly 100 of the present invention may include any suitable number of resistance welding heads 110, and in the present embodiment, includes a series of three resistance welding heads 110.

Each resistance welding head 110 includes a box-like body 111. The body 111 includes a pair of end plates 112 opposed to each other in the direction Y and a top plate 114 which connects upper portions of the end plates 112 in the depth direction Y. The top plate 114 of each resistance welding head 110 is fixed on the bottom surface of the holder 29 so that they are moved up and down together.

A pair of guide bars 115 extending in the direction Y are fixed between the end plates 112 of the body 111. The guide bars 115 are spaced from each other vertically. In the illustrated embodiment, they form a floating guide mechanism for supporting the pair of holding units 116 in a manner of floating movably in the direction Y.

Each holding unit 116 includes a slide section 116a guided by the guide bars 115, an insulation plate 116b provided on the lower portion of the slide section 116a, a block 116c which is electrically insulated through the insulation plate 116b from the slide section 116a, an electrode holder 116d secured to the lower end of the block 116c, and an electrode 116e held on the electrode holder 116d, as an integrated unit.

The slide section 116a of each holding unit 116 is a substantially rectangular metallic member which passes over the guide bars 115. The slide section 116a has a slide bearing 116j for every corresponding guide bar 115. The slide bearings 116j permit the slide section 116a (accordingly, the holding unit 116) to reciprocate smoothly in the direction Y with a very small sliding resistance.

The block 116c and electrode holder 116d are made of any suitable metal material having a high conductivity, such as chrome copper or the like and they are formed symmetrically at the front and rear sides and the left and right sides in the direction Y.

The electrode 116e is made of a suitable high strength conductive material, such as tungsten or a tungsten alloy. The electrodes 116e weld the tabs B1 of the bus bars B by flowing a current supplied from the electrode holder 116d into the tabs B1.

Referring to FIGS. 5 and 6, an electrode attachment tab 116f is secured to the block 116c of each resistance welding head 110 in order to flow current into the electrodes 116e of each resistance welding head 110. The electrode attachment tabs 116f, as shown in FIG. 6, include arms that have different lengths and are bent at a right angle in the directions X and Y, as viewed from the bottom in the drawing, in order to avoid interference between them.

In FIG. 4, each resistance welding head 110 includes an air cylinder 117 which drives the electrodes 116e relative to each other between a welding position where the electrodes 116e clamp the tabs B1 of the bus bars B by driving the holding unit 116 in the direction Y and a releasing position where the electrodes 116e release the tabs B1. Each air cylinder 117 is held through a cylinder bracket 116g on one (the right side in the drawing) of the slide sections 116a of the pair of holding units 116 so that a rod 117a can move in the direction Y. The rod 117a is coupled through a coupling 117b to a rear end of a driving shaft 118 which extends through the slide section 116a of the corresponding holding units 116. The shaft 118 is a metallic member, formed of any suitable metallic material, which extends through the end plates 112 in the direction Y. Slide bearings 116h mounted slidably on the driving shaft 118 are attached to the slide sections 116a of each holding unit 116. Each holding unit 116 allows the driving shaft 118 to move in the direction Y through the slide bearings 116h. As shown in FIG. 4, the air cylinder 117 is attached to one of the holding units 116 and the other holding unit 116 is driven by the driving shaft 118, so that the one holding unit 116 exerts a reaction force and both holding units 116 are driven symmetrically relative to each other in the direction Y.

The air cylinder 117 is provided with two systems of pressurized-air supply lines L1 and L2 for supplying pressurized air from a pressurized-air supply apparatus (not shown). Electromagnetic valves V1 and V2 are provided in the respective pressurized-air supply lines L1 and L2 to selectively supply the pressurized-air to the lines. One of the electromagnetic valves V1 and V2 (the one provided in the pressurized-air supply line L1 in the illustrated embodiment) is a regulating valve for high pressure to be used in the welding process while the other one of the electromagnetic valves V1 and V2 (the one provided in the pressurized-air supply line L2 in the illustrated embodiment) is a regulating valve for low pressure to be used in the dressing process. The respective electromagnetic valve V1 and V2 may be controlled by selectively opening one of them in accordance with the respective processes described below or may be controlled by opening both valves V1 and V2 upon welding and by opening only the electromagnetic valves V2 for low pressure upon dressing.

In order to displace the electrodes 116e to the welding position, a driving flange 118a for driving the front side holding unit 116 rearward is secured to the distal end of the driving shaft 118. In the illustrated embodiment, an attachment position of the driving flange 118a on the shaft 118 can be adjusted by screws 118b. A pressure-receiving sleeve 119 is slidably mounted on the driving shaft 118 in the direction Y between the driving flange 118a and the slide section 116a of the front side holding unit 116. The pressure-receiving sleeve 119 is provided on the front end with a pressure-receiving flange 119a opposed to and coaxial with the driving flange 118a. A compression coil spring 120 is disposed between the pressure-receiving flange 119a and the driving flange 118b. Thus, when the driving shaft 118 retracts to drive the pressure-receiving flange 119a rearward through the coil spring 120, the driving force is transmitted to the front side holding unit 116, thereby retracting the holding unit 116. Consequently, the reaction force exerted upon driving is transferred to the rear side holding unit 116, thereby displacing the rear side holding unit 116 forward.

On the other hand, in order to displace the electrodes 116e to the releasing position, a pushing flange 121 disposed between the pair of holding units 116 is fixed on an intermediate portion of the driving shaft 118. The front side holding unit 116 is provided on the rear side surface with a pressure-receiving projection 122 opposed to the pushing flange 121. Thus, when the driving shaft 118 is displaced forward, the pushing flange 121 is displaced forward to push the pressure-receiving projection 122 forward, thereby enabling the front side holding unit 116 to be displaced forward. The reaction force exerted upon driving is transferred to the rear side holding unit 116, thereby displacing the rear side holding unit 116 rearward.

Further, in the illustrated embodiment, in order to limit a position where the respective holding units 116 are displaced to the releasing position, stopper pins 123 and 124 extending toward the holding units 116 opposed to each other in the direction Y are secured to the respective end plates 112 and 112. Compression coil springs 125 and 126 are disposed on the outer peripheries of the stopper pins 123 and 124 between the end plate 112 and the holding units 116. Thus, according to this embodiment, the stopper pins 123 and 124 limit the holding units 116 when the electrodes 116e are displaced to the releasing position, while the holding units 116 (accordingly, the electrodes 116e) are to be set in an elastically movable condition in the direction Y between the both stopper pins 123 and 124 when the electrodes 116e are disposed to the welding position.

Next, a detecting mechanism for controlling an operation of the electrodes 116 will be described below.

Referring now to FIG. 4, a pair of dogs 127 and 128 are provided on the opposite ends of the driving shaft 118. The dog 127, which is provided on the front side end of the driving shaft 118, detects an amount of displacement of the front side holding unit 116. When the dog 127 is detected by a detector SW1 provided on a lower portion of the side section 116a of the front side holding unit 116, the detector SW1 can determine whether or not the electrode 116e held in the front side holding unit 116 is in the welding position. On the other hand, the dog 128 provided on the rear side end of the driving shaft 118 is guided by a guide section 124a extending from the rear portion of the stopper pin 124. The dog 128 is aligned with a detector SW2 provided on an upper portion of the air cylinder 117. When the dog 128 is detected by the detector SW2, the detector SW2 can determine whether or not the electrode 116e held in the rear side holding unit 116 is in the welding position.

Next, a rod 140 extending in the direction Y is fixed on a lower end of the front side slide section 116a provided on the front side holding unit 116. The rear end of the rod 140 passes slidably through a sleeve 141 provided on a lower portion of the rear side slide section 116a of the rear side holding unit 116. Further, a dog 142 is fixed on the rear end of the rod 140. The dog 142 is aligned with a non-contact type displacement detector SW3 attached to the cylinder bracket 116g. The non-contact type displacement detector SW3 includes an eddy current type sensor having a resolution of, for example, 0.002 mm. In the illustrated embodiment, it is possible to detect a melting amount upon welding the tabs B1 of the bus bars B in accordance with detecting signals from the non-contact type displacement detector SW3. In the illustrated embodiment, a stay 144 fixed on a distal end of the rod 140 holds the detector SW1 described above.

Figure 7:
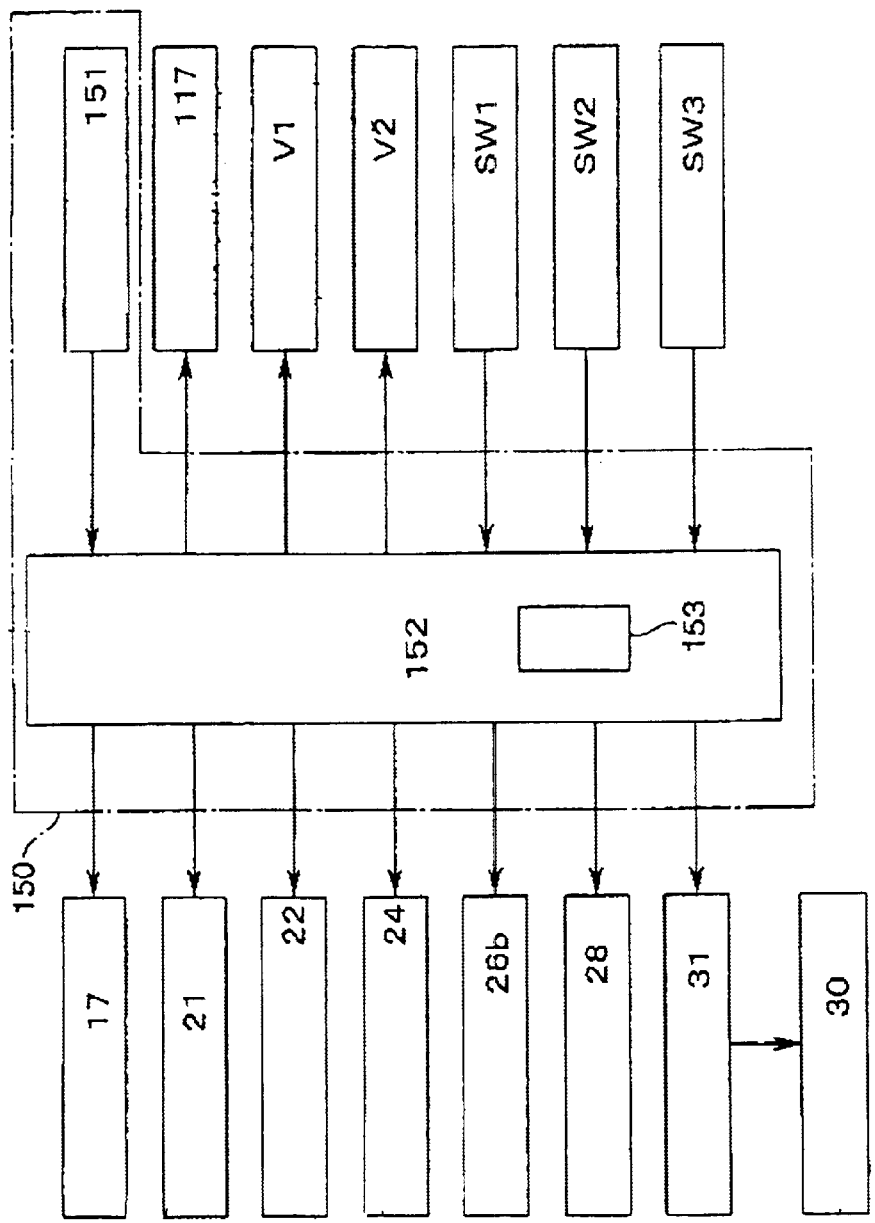
FIG. 7 is a block diagram of the resistance welding apparatus shown in FIG. 2 in accordance with the present invention.

FIG. 7 is a block diagram of the resistance welding apparatus 10 in the embodiment shown in FIG. 2.

In FIG. 7, a control device 150 is provided in the resistance welding apparatus 10. The control device 150 includes a microprocessor 152 to be actuated by an operating switch 151 and electrical devices to be connected to the microprocessor 152. It is possible to automatically control the respective motors 17 and 21, the respective cylinders 22, 24, 26b and 28, the controller 31 of the transformer 30 and the electromagnetic valves V1 and V2 in accordance with the detecting signals from the respective detectors SW1, SW2 and SW3 by actuating the operation switch 151.

The microprocessor 152 includes a memory section 153 which stores a program and data for carrying out a controlling operation described below.

FIGS. 8(A) and 8(B) are explanatory view illustrating a controlling operation of the control device 150 in the embodiment shown in FIG. 2.

In FIGS. 8(A) and 8(B), as described above, each resistance welding head 110 includes the respective electrodes 116e which are spaced at equal intervals of N times the pitch P of the tabs B1. The electrodes 116e may be spaced at any suitable interval, and in the present embodiment, are spaced at an interval of five times the pitch P (shown as P×5 in FIG. 8A). The control device 150 is set to control the motor 21 as an intermittent driving mechanism so that the respective resistance welding heads 110 pass over the welded tabs B1 by the intervals corresponding to the number of the resistance welding heads 110 in the case where the respective electrodes 116e of the respective resistance welding beads 110 are driven intermittently at an interval of N−1 (four (4) in the illustrated embodiment) times of the pitch of the tabs B1.

Figure 9A:
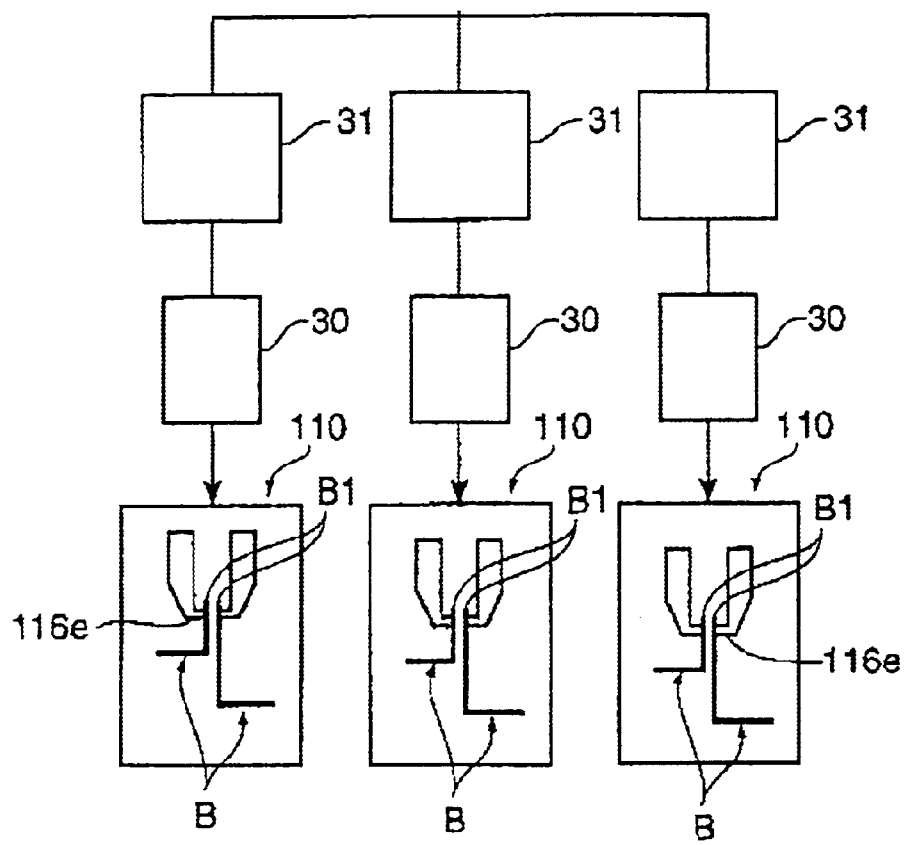
FIGS. 9(A) and (B) illustrate a feeding system for welding current in the apparatus shown in FIG. 2 in accordance with the present invention, FIG. 9(A) being a block diagram and FIG. 9(B) being a timing chart.
Figure 9B:
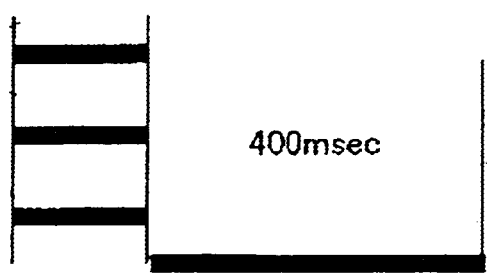

FIGS. 9(A) and 9(B) illustrate a feed system for welding current in the embodiment shown in FIG. 2. FIG. 9(A) is a block diagram and FIG. 9(B) is a timing chart.

As shown in FIG. 9(A), in the illustrated embodiment, it is possible to simultaneously supply welding current to the electrodes 116e of the respective resistance welding heads 110 in the welding operation described above, since the controller 31 is provided for every transformer 30. Consequently, as shown in FIG. 9(B), it is possible to shorten the welding period of time when the electrodes 116e move from a tab B1 to the adjacent tab B1 as a single welding period of time.

Figure 10:
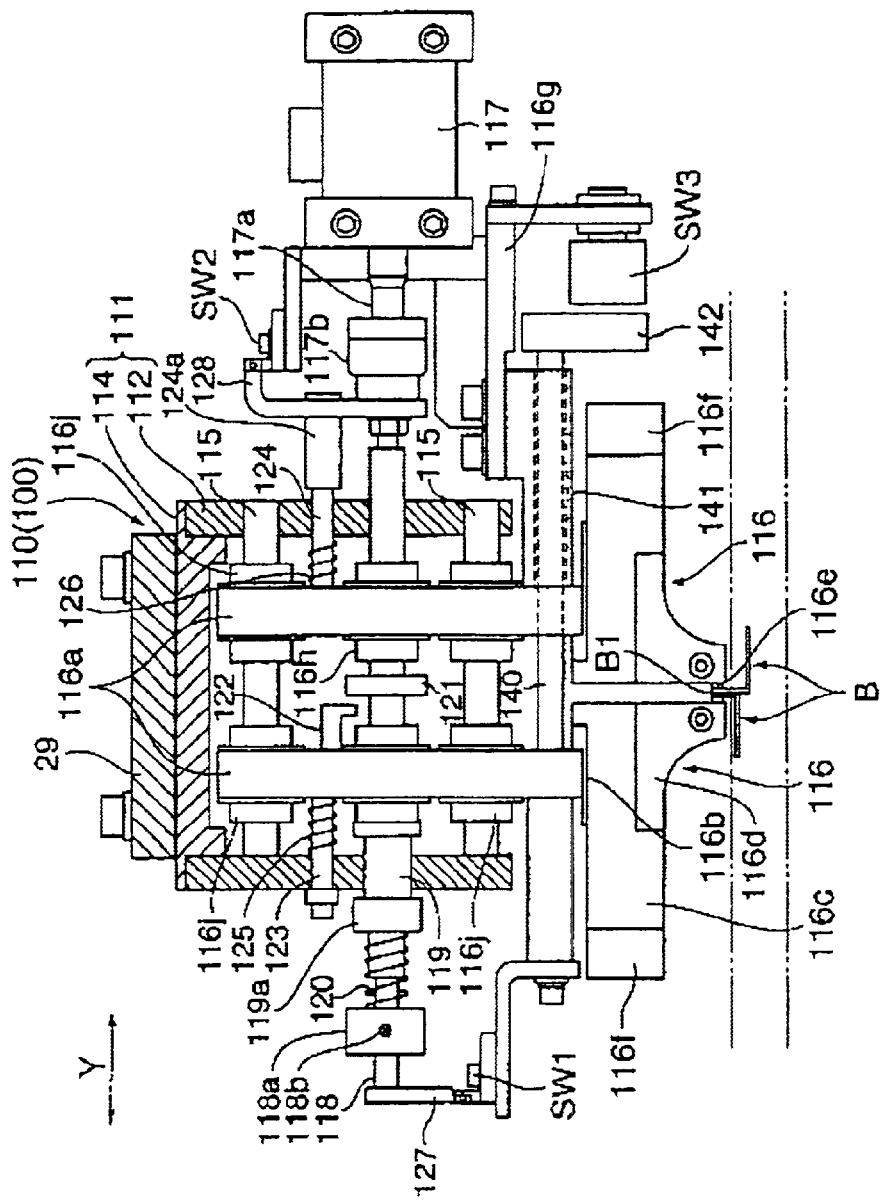
FIG. 10 is a longitudinal sectional view of the welding head assembly in the apparatus shown in FIG. 2 in accordance with the present invention, illustrating a process in which a resistance welding head moves from a releasing position to a welding position.

Next, reference is made to FIGS. 1 through 15, in particular to FIG. 10, showing an operation of the embodiment of the apparatus shown in FIG. 2. FIG. 10 is a longitudinal sectional view of the apparatus in the embodiment shown in FIG. 2, illustrating a process of the resistance welding heads displacing from the releasing position to the welding position.

In the resistance welding apparatus 10 having the construction described above, the work holder 23 moves to a work detachable position in the initial condition and the other driving members are in a position shown in FIG. 3. Under this condition, the bus bars B explained in association with FIG. 1 are mounted on the work holder 23 of the resistance welding apparatus 10 shown in FIG. 2 and the operating switch 151 of the control device 150 is actuated. As described above, the bus bars B fixed on the work holder 23 are aligned with their tabs B1 being welded precisely with the direction X. Under this condition, when the operating switch 151 is actuated, initially the rodless cylinder 22 is driven and the work holder 23 is displaced to a supply position shown by a solid line in FIG. 3. Then, the air cylinder 28 extends its rod 28a to lower the welding head assembly 110 to the position where the respective resistance welding heads 110 can clamp the bus bars B1.

Under the condition shown in FIG. 4 in the present embodiment, the air cylinders 117 provided on the respective resistance welding heads 110 retract their rods 117a to displace the driving shafts 118 to the rear side. Consequently, the driving flange 118a provided on each driving shaft 118 biases elastically the front side holding unit 116 rearward through the coil spring 120 and pressure-receiving sleeve 119, thereby displacing the front side holding unit 116 further rearward. In addition, the reaction force acting on the driving shaft 118 upon driving operation is transferred to the rear side holding unit 116, thereby displacing the rear side holding unit 116 forward by the same distance as that of the rearward displacement of the front side holding unit.

Figure 11B:
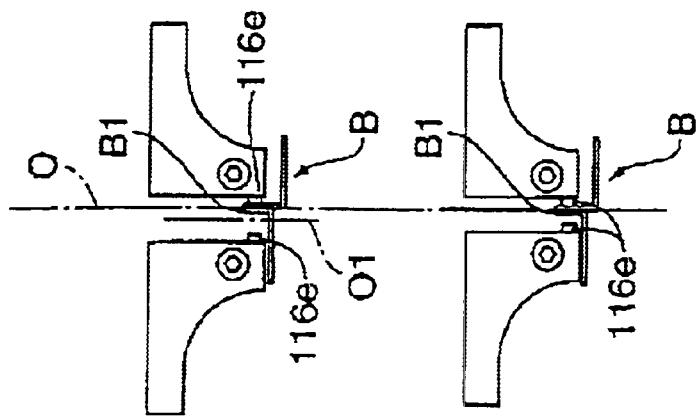
FIGS. 11(A) and (B) illustrate an operating process of the resistance welding head in the apparatus shown in FIG. 2 in accordance with the present invention, FIG. 11(A) being an operating process of the head having a floating mechanism and FIG. 11(B) being an operating process of the head having no floating mechanism.
Figure 11A:
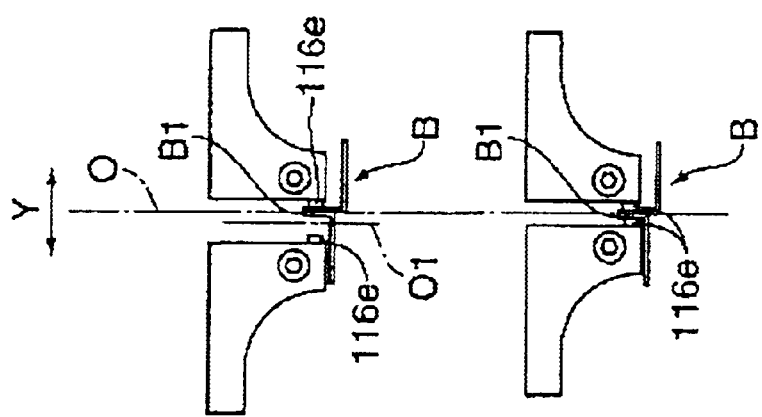

FIGS. 11(A) and 11(B) illustrates an operating process of the resistance welding heads 110. FIG. 11(A) illustrates an operating process of a resistance welding head 110 having a floating mechanism in the present embodiment and FIG. 11(B) illustrates an operating process of a resistance welding head 110 having no floating mechanism.

Referring to FIG. 11(A), when the electrodes 116e are displaced from the releasing position shown in FIG. 4 to the welding position shown in FIG. 10, if the center O1 of the distance between the opposing electrodes 116e does not coincide with the joining center O of the distance between the joined tabs B1 of the bus bars B, the holding units 116 holding the electrodes 116e can be moved along the guide bars 115 in the direction Y within an allowable range for the stopper pins 123 and 124 (see FIG. 10). Consequently, the reaction force exerted by the electrode 116e, which has initially come into contact with the tab B1 of the bus bar B, causes both holding units 116 (accordingly, both electrodes 116e) to be moved in the direction Y. Thus, as shown in the lower side of FIG. 11(A), the center O1 of both electrodes 116e coincides with the joining center O of the tabs B1 of the bus bars B. Since the present embodiment can perform such self-centering function, both electrodes 116e can equally come into contact with the tabs B1 of the bus bars B upon the final welding position and can carry out precise welding.

On the other hand, in the case where there is no floating mechanism, as shown in FIG. 11(B), both electrodes 116e present in clamping the tabs B1 with respect to the opposing center O1. Accordingly, as shown in the lower side of FIG. 11(B), only one of the electrodes 116e comes into contact with the tab B1 of the bus bar B.

Figure 12:
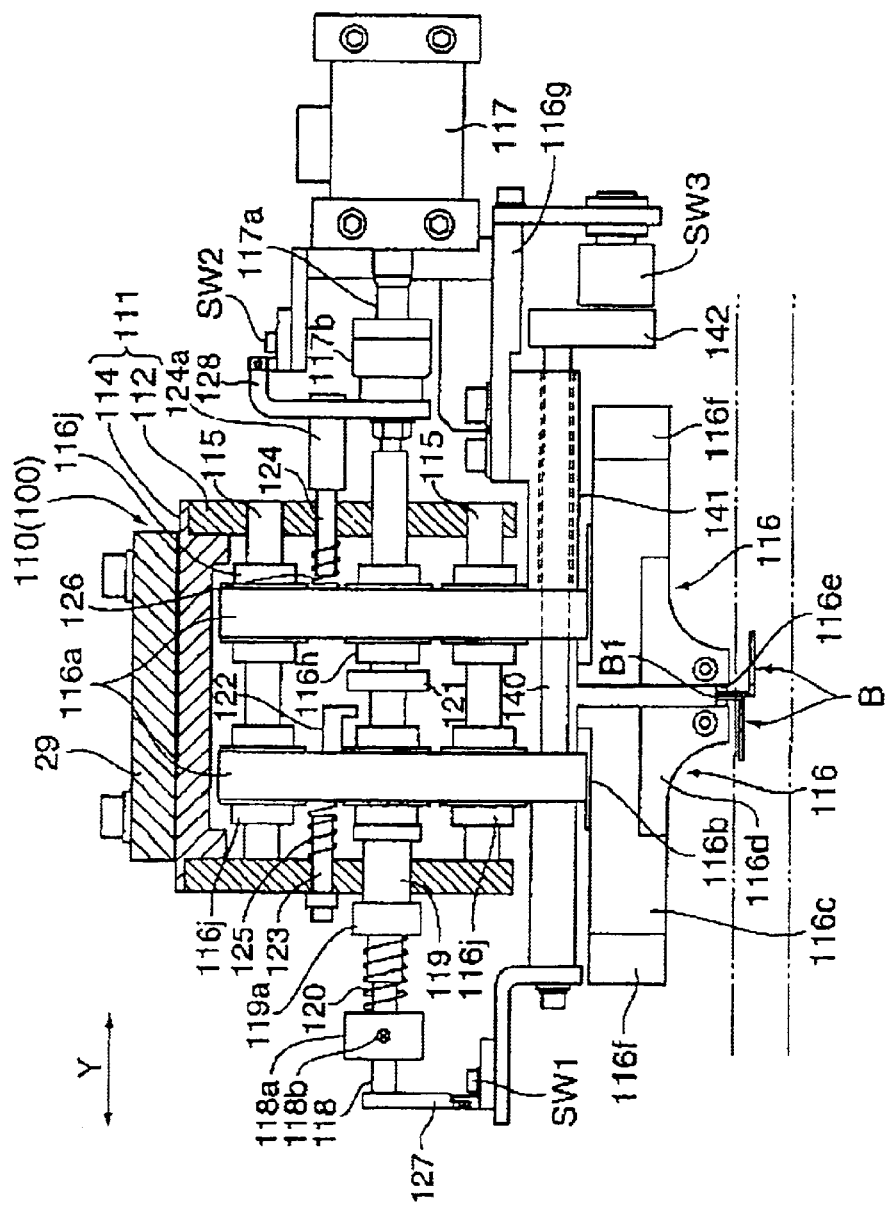
FIG. 12 is a longitudinal sectional view of the welding head assembly in the apparatus shown in FIG. 2 in accordance with the present invention, illustrating the resistance welding head in the welding position.

FIG. 12 is a longitudinal sectional view of the resistance welding head in the welding position in accordance with the embodiment shown in FIG. 2.

Referring to FIG. 12, both electrodes 116e are displaced to the welding position, the respective detectors SW1 and SW2 detect the displacement. The microprocessor 152 of the control device 150 controls the controller 31 of the transformer 30 in accordance with the detected results and causes a large current to flow in the electrodes 116e of the respective resistance welding heads 110. Thus, the electrodes 116e of the respective welding heads 110 weld simultaneously the corresponding tabs B1 of the bus bars B (see FIG. 9(B)).

As the resistance welding process proceeds, the joined surfaces of the tabs B1 of the bus bars B are melted and the distance between the opposed electrodes 116e is decreased. The detector SW3 detects precisely this displacement and sends signals to the microprocessor 152. The microprocessor 152 determines the welding condition in accordance with the controlling condition stored in the memory section 153 and the detecting signals from the detector SW3. When the microprocessor 152 determines that the welding is finished, it controls the controller 31 to cease the current supply. Then, the air cylinder 117 is driven to advance the driving shaft 118 and the pushing flange 121 of the driving shaft 118 pushes the front side holding unit 116 forward. Both holding units 116 are separated away in the direction Y and the electrodes return to the releasing position.

When the electrodes 116e of all resistance welding heads 110 return to the releasing position, the control device 150 drives the motor 21 as the intermittent driving mechanism and drives the work holder 23 through the feed table 19 by one pitch P of the tab B1 in each welding head assembly 100. Then, the respective tabs B1 of the bus bars B are welded one after another by repetition of the above operation. When one resistance welding head 110 is fed to tabs B1 immediately before the tabs B1 that have already been welded by the resistance welding head 110 connected to the one resistance welding head 110, the passing action over the welded tabs B1 is effected after welding the front side tabs B1 (see FIG. 8). Accordingly, a plurality of resistance welding heads 110 can efficiently weld many tabs B1.

Figure 13:
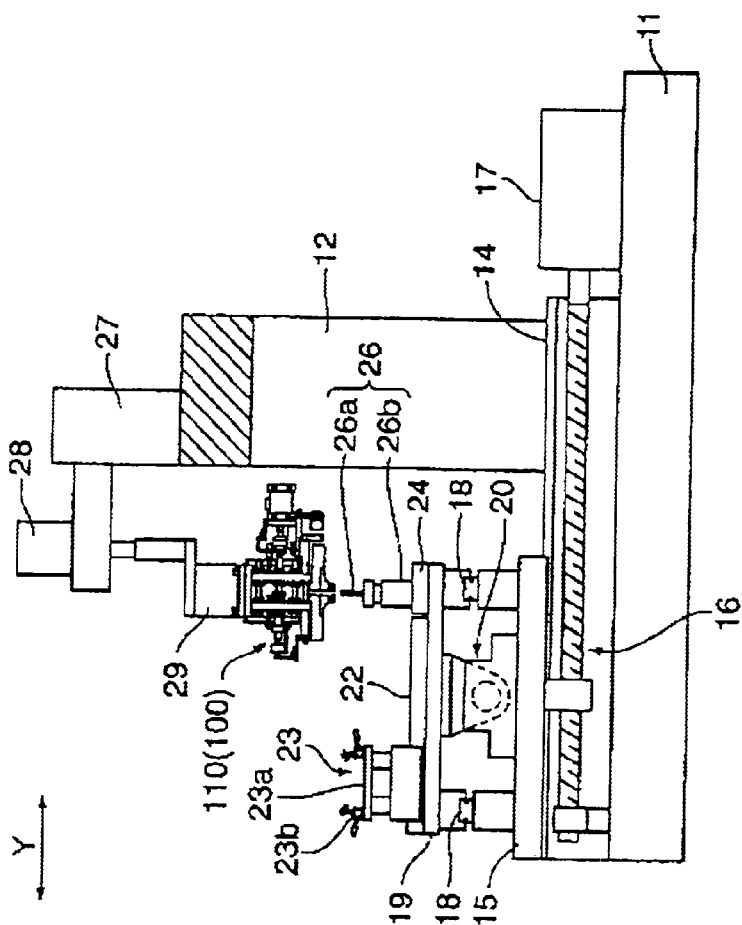
FIG. 13 is schematic side elevation view of the resistance welding apparatus shown in FIG. 2, illustrating an operation after resistance welding.

FIG. 13 is a side elevation view of the embodiment shown in FIG. 2, illustrating an operation after resistance welding.

Referring to FIG. 13, when all tabs B1 are welded, the welding head assembly 100 is driven upward by the air cylinder 28 after the electrodes 116e of the respective resistance welding heads 110 return to the releasing position.

Then, the work holder 23 is returned to the front side supply position by the rodless cylinder 22. In parallel with this action, the motor 21 is driven to displace the slide table 15 slightly forward. The dressing unit 26 is disposed immediately below the resistance welding head 110. Under this condition, the air cylinder 28 lowers the welding head assembly 110 again. The respective electromagnetic valves V1 and V2 are controlled so that the electrodes 116e clamp the dressing plate 26a of the dressing unit 26 by a low pressure. The air cylinder 26b of the dressing unit 26 elevate the dressing plate 26a to polish the surfaces of the respective electrodes 116e.

The respective members return to the initial condition after finishing the polishing process.

As described above, according to the above embodiment, since the self-centering function can align the center O1 of the respective electrodes 116e with the joining center O of the tabs B1, it is possible to carry out precise welding and to increase a yield of welding, even if the tabs B1 of the bus bars B are arranged in a poor alignment condition.

In particular, according to the above embodiment, since a plurality of electrodes 116e are spaced at an interval of an integer times the pitch of the tabs B1 of the bus bars B in the juxtaposing direction of the tabs, the electrodes 116e can weld the tabs while intermittently driving the respective resistance welding heads at the pitch of the tabs simultaneously and the respective resistance welding heads 110 are driven so that the respective electrodes 116e pass over the welded tabs B1, it is possible to shorten the welding time.

The above described embodiment is preferred, and the present invention is not limited to the above embodiment.

Figure 14:
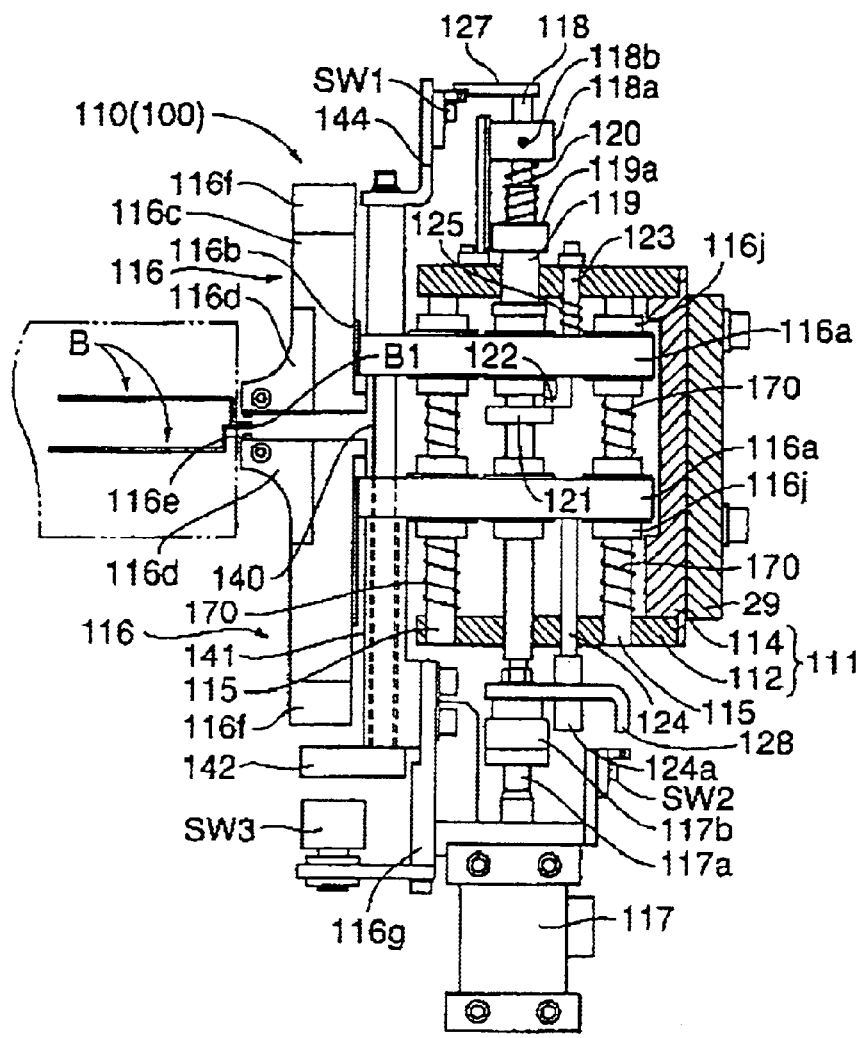
FIG. 14 is a longitudinal sectional view of the welding head assembly in another embodiment of a resistance welding apparatus in accordance with the present invention.

FIG. 14 is a schematic longitudinal sectional view of another embodiment of a resistance welding head in accordance with the present invention.

Referring to FIG. 14, the resistance welding head 110 may be mounted vertically in compliance with a particular component, such as an electric connection box, without limiting the embodiment shown in FIG. 2 in which the respective electrodes are opposed to each other horizontally. In this case, the pair of electrodes 116e are not subject to the influence of gravity, since the electrodes 116e are disposed to move vertically. Thus, in the embodiment shown in FIG. 14, compression coil springs 170 are mounted on the outer peripheries of the guide bars 115 between a lower end plate 112 and a lower holding unit 116 and between the lower holding unit and an upper holding unit 116 and the biasing force exerted by the coil springs 170 can cancel the load due to gravity.

It is possible in this structure to perform the self-floating function in the vertical direction similar to the embodiment shown in FIG. 2 and to carry out precise welding even if the tabs B1 of the bus bars B are arranged in a poor alignment condition.

Figure 15A:
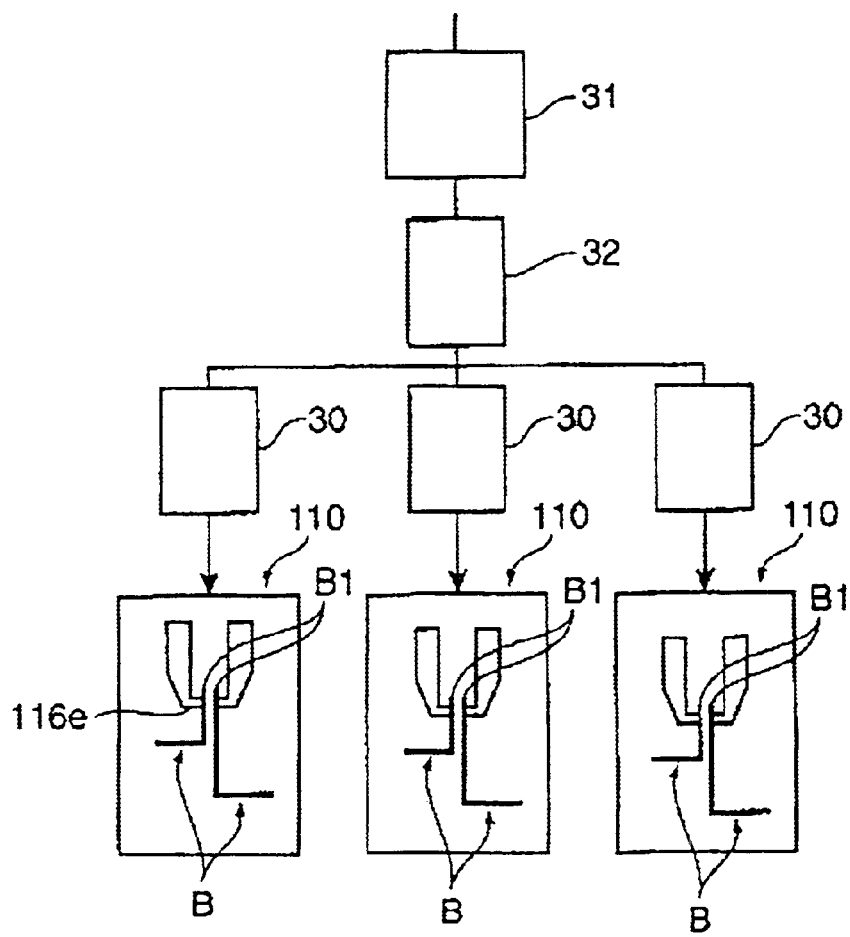
FIGS. 15(A) and (B) illustrate a feeding system for welding current in another embodiment of a resistance welding apparatus in accordance with the present invention, FIG. 15(A) being a block diagram and FIG. 15(B) being a timing chart.
Figure 15B:
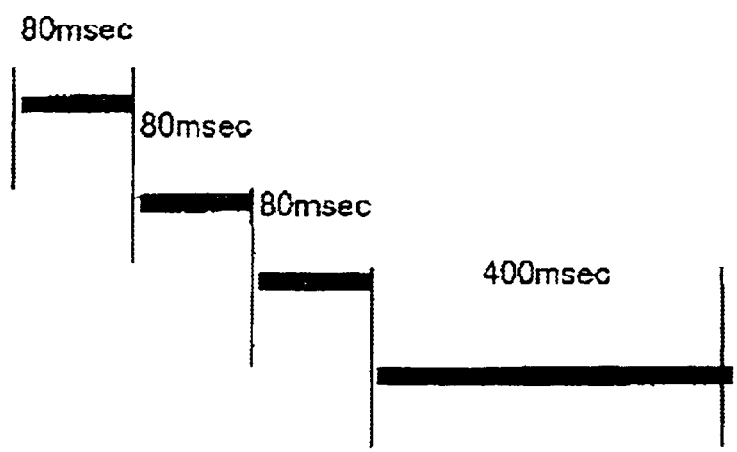

FIGS. 15(A) and 15(B) illustrate a feed system for welding current in accordance with another embodiment. FIG. 15(A) is a block diagram and FIG. 15(B) is a timing chart.

Referring to FIG. 15, this embodiment includes a single controller 31 that controls the respective transformers 30 and a transformer-switching device 32 between the controller 31 and the transformer 30.

In this embodiment, feed control for the respective resistance welding heads 110 is effected for every head to enhance the accuracy of welding and to lower the cost of welding.

From the above description of the invention, those skilled in the art will perceive improvements, changes and modifications. Such improvements, changes and modifications within the skill of the art are intended to be covered by the appended claims.

Although the invention has been described with reference to an exemplary embodiment, it is understood that the words that have been used are words of description and illustration, rather than words of limitation. Changes may be made within the purview of the appended claims, as presently stated and as amended, without departing from the scope and spirit of the invention in its aspects. Although the invention has been described with reference to particular means, materials and embodiments, the invention is not intended to be limited to the particulars disclosed. Rather, the invention extends to all functionally equivalent structures, methods, and uses such as are within the scope of the appended claims.

The present disclosure relates to subject matter contained in priority Japanese Application No. 2001-222034 filed on Jul. 23, 2001, including specification, claims, drawings, and summary, which is herein expressly incorporated by reference in its entirety.

What is claimed is:

1. A resistance welding head comprising:

a pair of holding units including a pair of electrodes, said holding units being movable relative to each other in a joining direction between a welding position in which said electrodes clamp together and a releasing position in which said electrodes are spaced from each other;

a floating guide that supports said pair of holding units for floating movement toward and away from one another in said joining direction between said welding position and said releasing position; and a driving mechanism that drives said pair of holding units in said joining direction between said welding position and said releasing position, wherein said driving mechanism is provided on a first holding unit of said pair of said holding units and is configured to drive a second holding unit of said pair of holding units.

2. The resistance welding head according to claim 1, said floating guide further comprising:

a support body including a pair of end plates opposed to each other in said joining direction; and a pair of spaced guide bars, each said guide bar extending in said joining direction between said pair of end plates, said pair of guide bars supporting said pair of holding units for floating movement in said joining direction between said welding position and said releasing position.

3. The resistance welding head according to claim 2, each of said first and second holding units further comprising:

a block;

an electrode holder provided on a first end of said block and holding a respective electrode thereon;

an electrode attachment tab provided on said block and configured to provide current flow to a respective electrode; and a slide section provided on a second end of said block and guided by said guide bars, said slide section including first and second slide bearings, each of said first and second slide bearings corresponding to one of said pair of guide bars and configured to slide thereover in said joining direction, so that said pair of holding units reciprocate smoothly over said pair of guide bars in said joining direction from said welding position to said releasing position and from said releasing position to said welding position.

4. The resistance welding head according to claim 3, said driving mechanism further comprising:

a bracket provided on said first holding unit;

an air cylinder provided on said bracket, said air cylinder including a rod configured to reciprocate in said joining direction;

a drive shaft extending through slide bearings in said pair of slide sections; said drive shaft including a first end coupled to said rod;

wherein upon retraction of said rod, said drive shaft drives said second holding unit through said slide bearings in said pair of slide sections in said joining direction toward said first holding unit and reaction force produced thereby drives said first holding unit through said slide bearings in said joining direction toward said second holding unit so that said pair of holding units are driven symmetrically toward each other to said welding position.

5. The resistance welding head according to claim 4, said driving mechanism further comprising:

a driving flange provided on a distal end of said drive shaft;

a pressure receiving flange slidably provided on said drive shaft; and a compression spring provided on said drive shaft between said driving flange and said pressure receiving flange, wherein upon retraction of said rod, said pressure receiving flange is driven by said driving flange through said compression spring and said second holding unit is driven in said joining direction toward said first holding unit and the reaction force produced thereby drives said first holding unit in said joining direction toward said second holding unit so that said pair of holding units are driven symmetrically toward each other to said welding position.

6. The resistance welding head according to claim 4, said driving mechanism further comprising:

a pushing flange provided on said drive shaft between said first holding unit and said second holding unit; and a pressure receiving projection provided on said second holding unit, wherein upon extension of said rod, said drive shaft extends and said second holding unit is driven by said pushing flange in said joining direction away from said first holding unit and reaction force produced thereby drives said first holding unit through said slide bearings in said joining direction away from said second holding unit so that said pair of holding units are driven symmetrically toward each other to said releasing position.

7. The resistance welding head according to claim 6, said driving mechanism further comprising:

a pair of stopper pins provided on said pair of end plates, each said stopper pin extending from a respective end plate toward said holding units and limiting movement of said holding units in said joining direction to said releasing position; and a pair of compression coil springs, each said compression coil spring provided on a respective stopper pin between a respective end plate and holding unit, said pair of compression coil springs elastically holding said holding units in said welding position.

8. The resistance welding head according to claim 2, wherein said floating guide supports said pair of holding units for floating movement in said joining direction toward said welding position so that when said first and second holding units clamp together, said first and second electrodes contact a pair of bus bar tabs equally for precise welding.

9. The resistance welding head according to claim 2, wherein said floating guide supports said pair of holding units for floating movement in said joining direction toward said welding position so that when said first and second holding units clamp together, said first and second electrodes contact a dressing plate equally for precise polishing.

10. The resistance welding head according to claim 1, further comprising:

an intermittent driving mechanism that intermittently drives a plurality of resistance welding heads, the plurality of resistance welding heads being spaced from each other a distance equal to an integer times a pitch between articles to be welded, and the intermittent driving mechanism intermittently driving the plurality of resistance welding heads a distance equal to the pitch between articles to be welded; and a control device that controls said intermittent driving mechanism so that electrodes of the plurality of resistance welding heads may be driven a distance equal to an integer times the pitch of the articles to be welded and pass over the welded spots.

11. A method of welding using a resistance welding head, said method comprising:

providing a pair of holding units including a pair of electrodes, said holding units being movable relative to each other in a joining direction between a welding position in which said electrodes clamp together and a releasing position in which said electrodes are spaced from each other;

providing a floating guide that supports said pair of holding units for floating movement toward and away from one another in said joining direction between said welding position and said releasing position;

providing a driving mechanism that drives said pair of holding units in said joining direction between said welding position and said releasing position, wherein said driving mechanism is provided on a first holding unit of said pair of said holding units and is configured to drive a second holding unit of said pair of holding units; and driving said pair of holding units in said joining direction between said welding position and said releasing position while floatably guiding said pair of holding units.

12. The method of resistance welding according to claim 11, wherein said floating guide further comprises:

a support body including a pair of end plates opposed to each other in said joining direction;

a pair of spaced guide bars, each said guide bar extending in said joining direction between said pair of end plates, said pair of guide bars supporting said pair of holding units for floating movement in said joining direction between said welding position and said releasing position; and said method further comprises;

supporting said pair of holding units on said pair of guide bars and floatably moving said pair of holding units in said joining direction between said welding position and said releasing position.

13. The method of resistance welding according to claim 12, wherein each of said first and second holding units further comprises:

a block;

an electrode holder provided on a first end of said block and holding a respective electrode thereon;

an electrode attachment tab provided on said block and configured to provide current flow to a respective electrode; and a slide section provided on a second end of said block and guided by said guide bars, said slide section including first and second slide bearings, each of said first and second slide bearings corresponding to one of said pair of guide bars and configured to slide thereover in said joining direction, so that said pair of holding units reciprocate smoothly over said pair of guide bars in said joining direction from said welding position to said releasing position and from said releasing position to said welding position;

said method further comprises;

smoothly reciprocating said pair of holding units in said joining direction from said welding position to said releasing position and from said releasing position to said welding position.

14. The resistance welding method according to claim 13, wherein said driving mechanism further comprises:

a bracket provided on said first holding unit;

an air cylinder provided on said bracket, said air cylinder including a rod configured to reciprocate in said joining direction; and a drive shaft extending through slide bearings in said pair of slide sections, said drive shaft including a first end coupled to said rod;

wherein upon retraction of said rod, said drive shaft drives said second holding unit through said slide bearings in said pair of slide sections in said joining direction toward said first holding unit and reaction force produced thereby drives said first holding unit through said slide bearings in said joining direction toward said second holding unit so that said pair of holding units are driven symmetrically toward each other to said welding position;

said method further comprising;

driving said second holding unit in said joining direction toward said first holding unit, and thereby symmetrically driving said pair of holding units toward each other to said welding position.

15. The resistance welding method according to claim 14, wherein said driving mechanism further comprises:

a driving flange provided on a distal end of said drive shaft;

a pressure receiving flange slidably provided on said drive shaft; and a compression spring provided on said drive shaft between said driving flange and said pressure receiving flange, wherein upon retraction of said rod, said pressure receiving flange is driven by said driving flange through said compression spring and said second holding unit is driven in said joining direction toward said first holding unit and the reaction force produced thereby drives said first holding unit in said joining direction toward said second holding unit so that said pair of holding units are driven symmetrically toward each other to said welding position;

said method further comprising:

said driving flange driving said receiving flange through said compression spring and driving said second holding unit toward said first holding unit, thereby symmetrically driving said pair of holding units toward each other to said welding position.

16. The resistance welding method according to claim 14, wherein said driving mechanism further comprises:

a pushing flange provided on said drive shaft between said first holding unit and said second holding unit; and a pressure receiving projection provided on said second holding unit, wherein upon extension of said rod, said drive shaft extends and said second holding unit is driven by said pushing flange in said joining direction away from said first holding unit and reaction force produced thereby drives said first holding unit through said slide bearings in said joining direction away from said second holding unit so that said pair of holding units are driven symmetrically toward each other to said releasing position; and wherein said method further comprises;

said drive shaft extending and driving said second holding unit away from said first holding unit, thereby symmetrically driving said pair of holding units toward each other to said releasing position.

17. The resistance welding method according to claim 16, wherein said driving mechanism further comprises:

a pair of stopper pins provided on said pair of end plates, each said stopper pin extending from a respective end plate toward said holding units and limiting movement of said holding units in said joining direction to said releasing position; and a pair of compression coil springs, each said compression coil spring provided on a respective stopper pin between a respective end plate and holding unit, said pair of compression coil springs elastically holding said holding units in said welding position; and wherein said method further comprises:

said pair of stopper pins limiting said floating movement of said pair of holding units in said joining direction to said releasing position when said pair of holding units are moved away from each other; and elastically holding said pair of holding units in said welding position when said pair of holding units are moved toward each other.

18. The resistance welding method according to claim 12; wherein said floating guide supports said pair of holding units for floating movement in said joining direction toward said welding position so that when said first and second holding units clamp together said first and second electrodes contact a pair of bus bar tabs equally for precise welding, said method further comprising:

self-centering said pair of electrodes about a pair of bus bar tabs; and clamping said pair of electrodes together and welding the pair of bus bar tabs.

19. The resistance welding method according to claim 12, wherein said floating guide supports said pair of holding units for floating movement in said joining direction toward said welding position so that when said first and second holding units clamp together said first and second electrodes contact a dressing plate equally for precise polishing, said method further comprising:

self-centering said pair of electrodes about a dressing plate; and clamping said pair of electrodes together and polishing said pair of electrodes.

20. The resistance welding method according to claim 12, wherein said resistance welding head further comprises an intermittent driving mechanism and a control device, said method further comprising:

intermittently driving a plurality of resistance welding heads, the plurality of resistance welding heads being spaced from each other a distance equal to an integer times a pitch between articles to be welded, and the intermittent driving mechanism intermittently driving the plurality of resistance welding heads a distance equal to the pitch between articles to be welded; and controlling said intermittent driving mechanism so that electrodes of the plurality of resistance welding heads are driven a distance equal to an integer times the pitch of the articles to be welded and pass over the welded spots.

* * * * *